United States Patent [19]
Olgard et al.

[11] 3,794,167
[45] Feb. 26, 1974

[54] METHOD AND APPARATUS FOR SUPPLYING AND CONTROLLING FLOW OF A LIQUID SUSPENSION THROUGH LAMINAR APPARATUS

[75] Inventors: Gunnar Olgard; Bo Forsell, both of Nynashamn; Bengt Uddstrand, Stora Vika, all of Sweden

[73] Assignee: Rederiaktiebolaget Nordstjernan, Nynashamn, Sweden

[22] Filed: Dec. 6, 1972

[21] Appl. No.: 312,711

Related U.S. Application Data
[63] Continuation of Ser. No. 122,800, March 10, 1971, abandoned.

[30] Foreign Application Priority Data
Mar. 12, 1970 Sweden ............................. 3281/70

[52] U.S. Cl. .................. 210/84, 210/519, 210/522
[51] Int. Cl. ............................................. B01d 21/24
[58] Field of Search ......... 210/83, 84, 519, 521, 522

[56] References Cited
UNITED STATES PATENTS
1,825,550 9/1931 Schulte .............................. 210/521
3,628,667 12/1971 Somora et al. ..................... 210/519

FOREIGN PATENTS OR APPLICATIONS
746,980 3/1956 Great Britain ..................... 210/521
186,088 11/1963 Sweden ............................. 210/521
668,796 11/1938 Germany .......................... 210/521

*Primary Examiner*—John Adee
*Attorney, Agent, or Firm*—Davis, Hoxie, Faithfull & Hapgood; William F. Sonnekalb, Jr.

[57] ABSTRACT

A method and an apparatus for supplying and controlling the flow of a liquid suspension through a laminar apparatus having separate parallel sedimentation spaces formed by plate means inclined relative to the horizontal plane, wherein the suspension is supplied to the sedimentation spaces and the sediment in each of these spaces sinks downward and flows past the lower edge of the plate means down into a trough while the clarified liquid flows upwards and out through outlets provided in the upper part of the plate means.

The entering suspension is distributed over all sedimentation spaces over a wide area to prevent clogging, and the distribution of the suspension to and through each and all sedimentation spaces is controlled and maintained uniform by adjusted throttling of the outflow of clarified liquid through outlets from each sedimentation space.

7 Claims, 4 Drawing Figures

METHOD AND APPARATUS FOR SUPPLYING AND CONTROLLING FLOW OF A LIQUID SUSPENSION THROUGH LAMINAR APPARATUS

This application is a continuation of our copending application Ser. No. 122,800, filed Mar. 10, 1971, now abandoned.

This invention relates to a method and an apparatus for supplying and controlling the flow of a liquid suspension through a laminar apparatus of the kind comprising separate parallel sedimentation spaces formed by plate means inclined relative to the horizontal plane, wherein the suspension is supplied to the sedimentation spaces and the sediment in each of these spaces sinks downward and flows past the lower edge of the plate means down into a trough while the clarified liquid flows upwards and out through outlets provided in the upper part of the plate means.

By use of sedimentation apparatus having closely spaced inclined plates, the apparatus may possess separation capacity equivalent to conventional settling basins with sometimes only as little as 7 percent of the space requirements of the conventional settling basins.

In order to make such apparatus work in practice, it is important that the amount of inflow of the suspension to each parallel passageway be essentially the same.

The above-mentioned savings in space requirement will not materialize if such even distribution is not maintained. Although prior apparatuses have been known which used parallel inclined plates to provide parallel passageways, they did not have adequate means for even distribution. Uniform distribution has for example often been based on throttling the feed suspension through small openings, one or more for each passageway. Such arrangements will not maintain a steady uniform distribution as the openings are apt to become plugged by coarse particles in the feed or to become clogged by the high viscosity of the inflowing suspension.

The problem has been solved by the present invention, in which the inlet to the sedimentation spaces themselves is unrestricted, causing no pressure drop, and is thus insensitive to coarse particles, concentration, consistency, and flow of the suspension, and in which no directing is required. By the invention, the supply of the suspension is evenly and uniformly distributed to the different sedimentation spaces by throttling the clarified liquid as it flows out from each of the sedimentation spaces. This liquid is of low viscosity and does not include coarse particles and hence is readily controllable. It is an important element of the invention that the main pressure drop occur at the outflow from each sedimentation space.

The method according to the invention is characterized in that the entering suspension is distributed over all sedimentation spaces over a wide enough area to prevent clogging by the suspension, and further characterized by controlling the distribution of the flow to each sedimentation space by adjusted throttling of the outflow of clarified liquid through outlets from each sedimentation space. For carrying out the method, apparatus is provided that is characterized by the inlet for the supply of the suspension to the sedimentation spaces comprising one or several bottomless distributing boxes extending, transverse to plate means, across all of said sedimentation spaces and arranged such, that the suspension is supplied between the lower edge and the upper edge of the plate means.

An embodiment of the invention is described with reference to the accompanying drawings in which.

Figure 1:
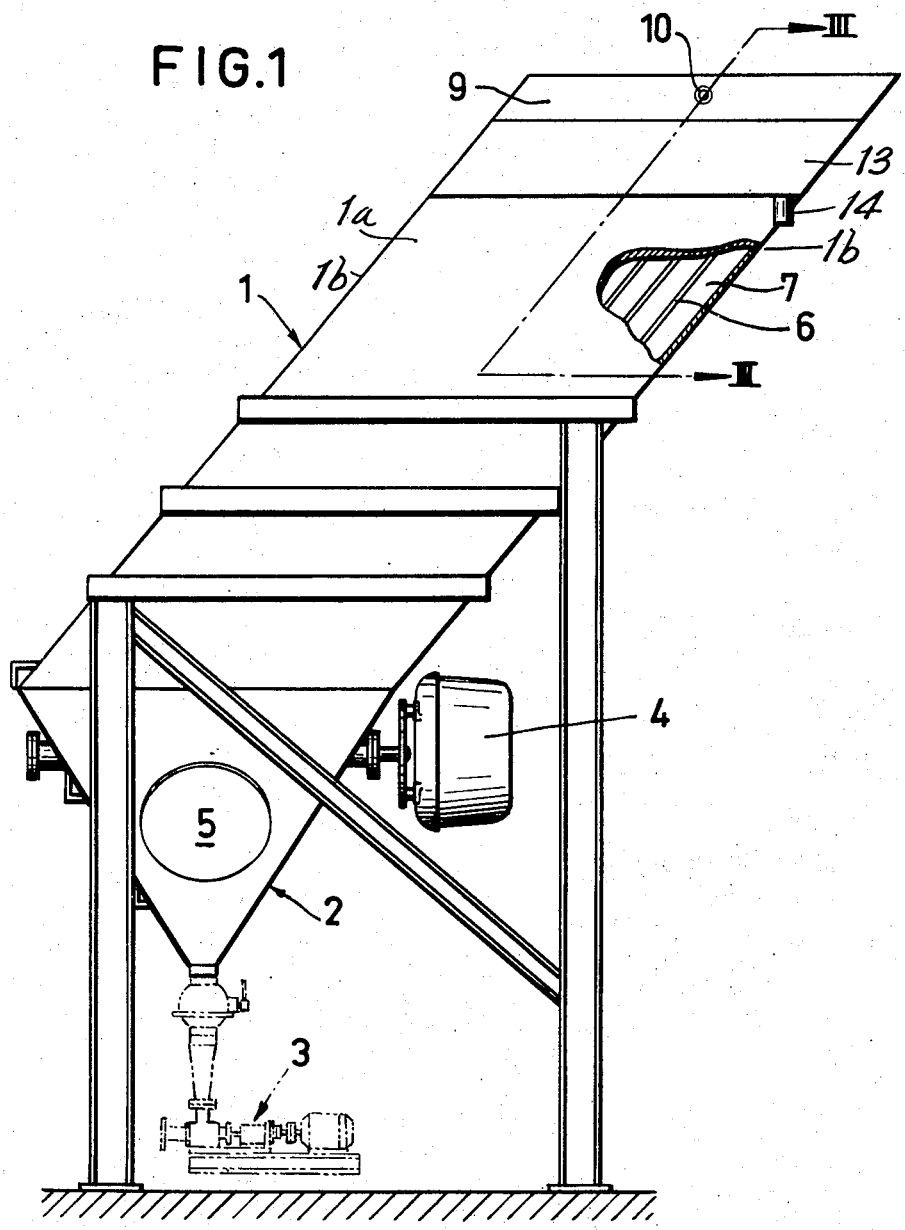
FIG. 1 is a side elevation view, partially broken away, of a laminar apparatus embodying the invention.
Figure 2:
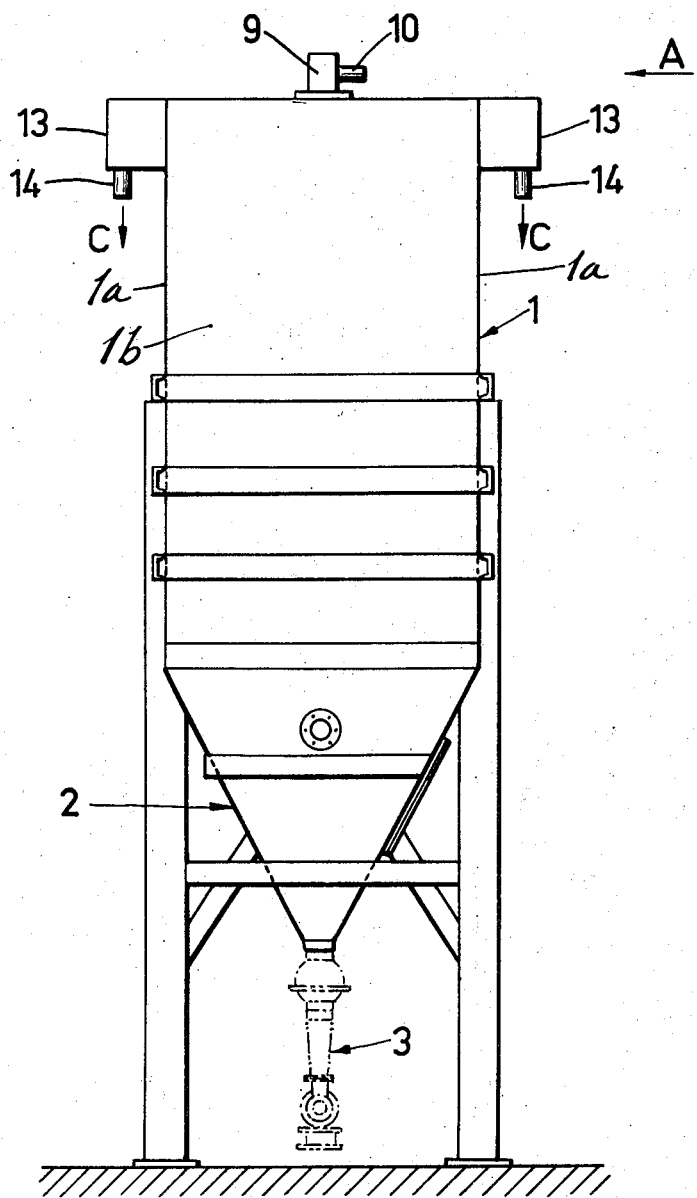
FIG. 2 is a front elevation view of the apparatus, as viewed from the left in FIG. 1.

The laminar apparatus, as shown in FIGS. 1 and 2, is supported by a stand and comprises an inclined housing having a sedimentation part 1, and an outlet part 2. The outlet part comprises a funnel-shaped trough for sediment which descends into it and is pumped out of the bottom by a pump means 3. The trough is provided with a vibrator 4 and an observation window 5.

The housing of the sedimentation part 1 comprises parallel spaced vertical side walls 1a and inclined spaced end walls 1b. A plurality of parallel inclined sedimentation passages 8 within the housing are defined by a plurality of parallel plates 6 that are inclined to the horizontal as shown in FIG. 1. Adjacent plates are bridged and connected by pairs of spaced plate members 15 that are bent into channel shape, as shown in FIGS. 3 and 4, and extend from the top of the plates 6 downwardly a short distance so as to act as stiffeners, for the plate and also to provide downward extending chamber 11 for the inlet distributing box 9 as hereinafter described.

At and along the means to sides or ends of the plates 6 and extending across the whole group are end plates 7 which are parallel to the vertical side walls 1a of the sedimentation part of the housing. The sedimentation takes place in each sedimentation passage independent of the remaining sedimentation passages, in such a manner that the heavier particles in the suspension sink to the upper surface of the plates 6 in each sedimentation passage and thereafter slide down along the inclined plates to the trough of the outlet part 2, while the clarified liquid is caused to ascend and flows out through outlets 12 in the upper portions of the sedimentation passages, as shown by arrow B in FIG. 3, and as more particularly described hereinafter.

Figure 3:
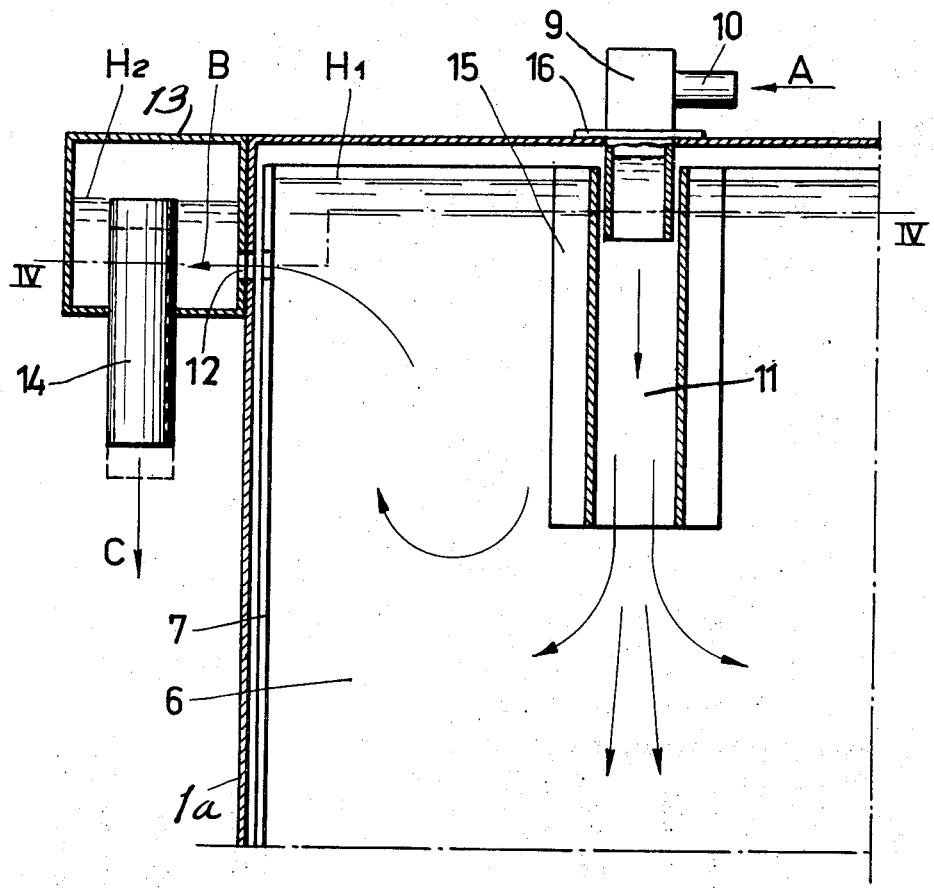
FIG. 3 is an enlarged partial section view taken along the line III—III in FIG. 1.
Figure 4:
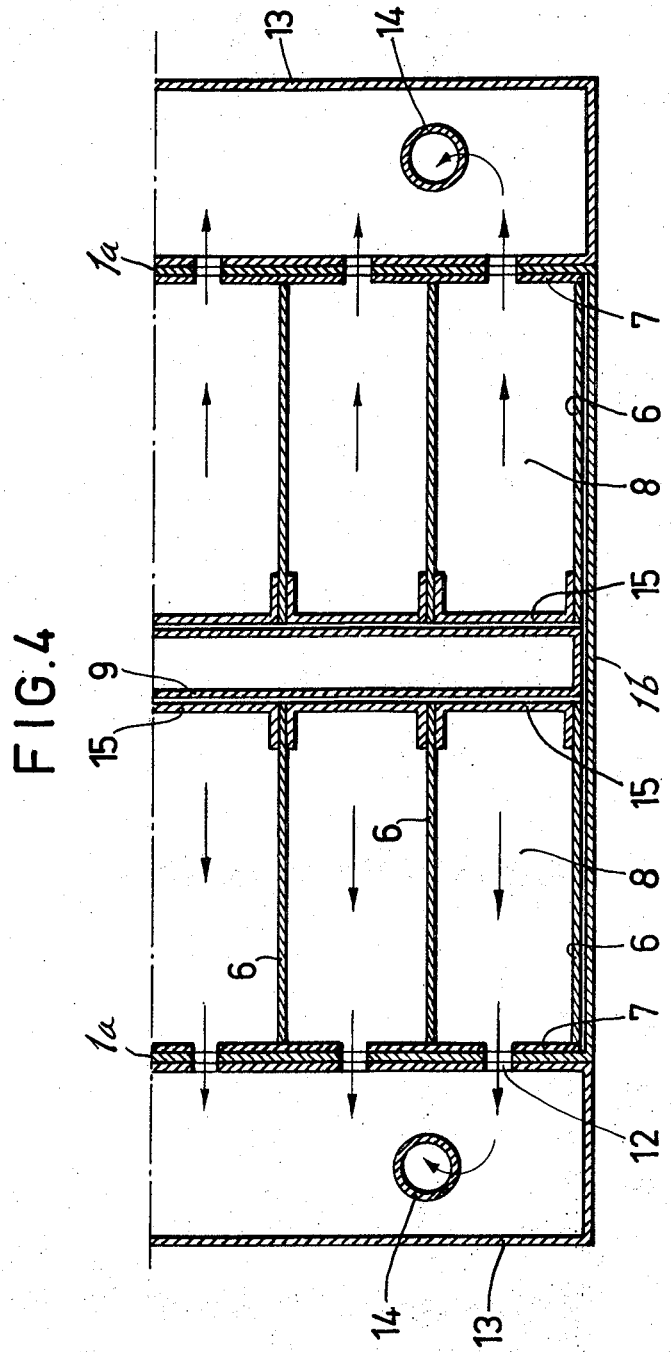
FIG. 4 is a partial section view taken along line IV—IV of FIG. 3.

The features characterizing the invention are the design of the inlet for the suspension, and the outlets for the clarified liquid, as shown in greater detail in FIGS. 3 and 4.

The suspension is supplied (arrow A) to the laminar apparatus via a distributing box 9 with an inlet pipe 10. The distributing box has perpendicular side and end plates but no bottom, and extends transversely across and over all sedimentation passages 8. It is supported by lateral flange plates 16 across the top of the apparatus and extends some distance down into the recesses 11 provided between opposite stiffening members 15, as shown in FIG. 3, in the upper portion of the plates 6. The stiffening members 15 thus form an extension of the distributing box downwards. The distributing box 9 is of such a width that there is no risk of clogging nor of incrustation formation. The box does not require precise positioning or form or adjustment.

The entering liquid flows into all the sedimentation passages 8. The manner of flow in each passage is as indicated by downwardly directed arrows in FIG. 3. The apparatus is filled with the liquid suspension to a variable controllable level $H_1$ (FIG. 3).

Uniform flow of the suspension through each and all of the parallel passages is very important for achieving the satisfactory and efficient operation of the invention. This is accomplished by having the clarified liquid flow upwards in the sedimentation passages and out, as indicated by arrow B, through aligned apertures 12 which are of equal size and are provided in the side plates 7 and in the casing wall 1a of the sedimentation part. The effluent flows into collecting boxes 13 which are located on both sides of the sedimentation part. From said collecting boxes the clarified liquid runs out, as shown by arrow C, through down pipes 14, the upper edges of which determine the position for the liquid level $H_2$ in said boxes.

The level $H_1$ will raise and fall as the feed rate varies as it normally does in practice. The greater the inflow the higher level $H_1$ will raise and vice versa. The apertures 12, as appears from FIG. 3, are located below the liquid levels $H_1$ and $H_2$. The pressure drop $H_1$–$H_2$ is the dominating pressure drop in the laminar apparatus. Thus, this pressure drop in cooperation with apertures 12 provide, control and regulate uniformity of flow throughout in each and every one of the parallel passages of the apparatus.

The invention can be varied in several ways. The distributing box 9, for example, may have a different design, provided that it meets the requirements. The box 9, for example, may extend all the way down to the lower edge of the recesses 11c. The number of distributing boxes and collecting boxes in each laminar apparatus may be one or several. The stiffening members 15 may be omitted. The depth of the inlet formed by the members 15 and/or distributing box down into the sedimentation spaces may be varied, so as to adjust the apparatus to different types of suspensions. The outlet pipe 14 for the clarified liquid, furthermore, need not be a down pipe as described and shown. Instead the outlets may be adjustable overflow means, for example, adjustable overflow weirs. Therefore, the invention is not limited to the specific embodiment illustrated and described.

From the foregoing, it will be apparent that while the structure, dimensions and positions of the parts of any installation remain constant, the normal rise and fall of the inflow will increase or decrease level $H_1$ while $H_2$ remains constant. This results in an increase or decrease in the pressure drop $H_1$–$H_2$ which in turn will cause a variation in the outflow through the apertures 12 in accordance with known hydraulic principles.

It is likewise apparent that a lowering or raising of the level $H_2$ by adjustment of the position of the overflow 14, as shown in broken lines in FIG. 3, whether it be an adjustable weir or a down pipe, will affect the pressure drop $H_1$–$H_2$ and hence the amount of outflow.

But, in all circumstances the distribution of the flow to all the sedimentation passages 6 will be uniform.

We claim:

1. The method of continuously treating a liquid suspension comprising the steps of
   providing a plurality of parallel inclined sedimentation passages,
   providing a common unimpeded feed transversely across all said passages,
   simultaneously and continuously feeding the suspension unimpedably to each of said sedimentation passages at an intermediate level in each passage between the top and the bottom of said passages,
   and maintaining the level of the suspension at a variable level above said intermediate level,
   discharging clarified liquid from each of said passages at a level below said variable level and above said intermediate level,
   and throttling at the discharge the flow of said clarified liquid from each of said passages to provide a uniform flow through all passages,
   maintaining the level of the suspension above the throttling level,
   and collecting below said sedimentation passages the sediment separated from said suspension,
   and removing the sediment without interfering with the operation.

2. The method as claimed in claim 1 including the step of collecting the discharged clarified liquid and maintaining it to a level in between said variable level and said throttling level, and removing said collected clarified liquid at said in-between level.

3. Apparatus for continuously treating a liquid suspension to separate clarified liquid from sediment comprising
   a housing
   a plurality of inclined parallel plate means within said housing providing a plurality of parallel inclined passags for the suspension therebetween,
   inlet means for the suspension extending across all said passages transversely with respect to said plate means and delivering without restriction,
   said inlet means extending to a level intermediate the length of said passages and delivering the suspension to said passages at said intermediate level,
   collecting means for receiving clarified liquid discharged from said passages,
   means providing for substantially uniform distribution of the suspension flowing through each of said parallel passages,
   said uniform-flow-providing means including meansto individually throttle and control the flow of clarified liquid from each of said parallel passages into said collecting means,
   said collecting means further including means for maintaining the liquid therein at a level above said throttling means, and
   means to withdraw the sediment while the apparatus remains in operation.

4. Apparatus as claimed in claim 3 in which said throttling means comprises a plurality of apertures from each parallel passage to said collecting means, to accomplish said throttling effect.

5. Apparatus as claimed in claim 3 having stiffening means connecting adjacent plate means and extending into the suspension below said inlet means so as to extend the points of inflow of said suspension further down into said sedimentation passages.

6. Apparatus as claimed in claim 3 wherein said inlet means comprises a bottomless distributing box.

7. Apparatus as claimed in claim 3 wherein the collecting means is provided with adjustable means to maintain the discharged liquid at different levels, all above said throttling means of the liquid in the housing.

* * * * *

UNITED STATES PATENT OFFICE
CERTIFICATE OF CORRECTION

Patent No. 3,794,167                Dated Feb. 26, 1974

Inventor(s) Gunnar Olgard, Bo Forsell and Bengt Uddstrand

It is certified that error appears in the above-identified patent and that said Letters Patent are hereby corrected as shown below:

Column 4, line 34 (Claim 3):

-- said suspension to all said passages -- to be inserted after "restriction", but before the comma [,];

line 43, "mean-" should be -- means --;

line 44, "sto" should be -- to --.

Signed and sealed this 9th day of July 1974.

(SEAL)
Attest:

McCOY M. GIBSON, JR.
Attesting Officer

C. MARSHALL DANN
Commissioner of Patents